Oct. 28, 1958  E. DOMINGO SEGUI ET AL  2,858,255
PROCESS AND DEVICE FOR THE REGENERATION OF MONOMERS
STARTING FROM POLYMETHACRYLATE AND, MORE
ESPECIALLY, METHYL POLYMETHACRYLATE
Filed Jan. 15, 1954
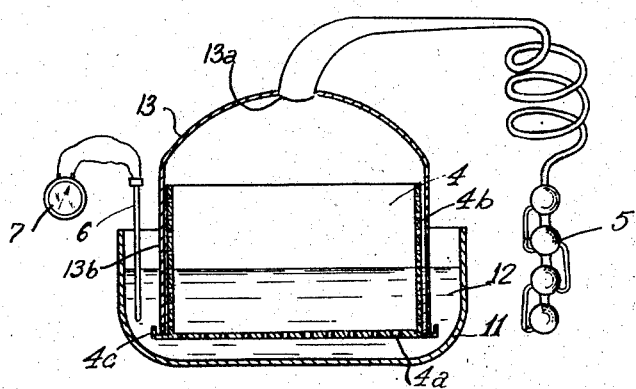
INVENTORS
ESTEBAN DOMINGO SEGUI &
BIENVENIDO CABANERO ALARCON
*by: J. Delatre-Seguy*
Attorney

United States Patent Office 2,858,255
Patented Oct. 28, 1958

2,858,255

PROCESS AND DEVICE FOR THE REGENERATION OF MONOMERS STARTING FROM POLYMETHACRYLATE AND, MORE ESPECIALLY, METHYL POLYMETHACRYLATE

Esteban Domingo Segui and Bienvenido Cabanero Alarcon, Barcelona, Spain

Application January 15, 1954, Serial No. 404,316

Claims priority, application France March 23, 1953

3 Claims. (Cl. 202—219)

This invention relates to the depolymerization of polymethacrylates and more particularly to the production of a monomeric methacrylate ester from the corresponding polymeric ester.

An object of this invention is to provide a simple, efficient and economical device for recovering said monomeric methacrylate esters from residues or from scrap pieces of the corresponding polymer.

A further object is to provide a device for recovering substantially all the monomeric ester in a substantially pure state.

Heretofore, it has been known that polymeric methylacrylate cannot be depolymerized by dry distillation, and the known methods consist in heating the polymer in admixture with inert substances such as sand, barium sulphate, or heavy spar, and are characterized by a very low efficiency.

As a feature of this invention for recovering monomeric esters from the corresponding polymethacrylate, the latter is heated to a temperature which will cause depolymerization; the fragments or residues of said polymer are heated in a bath of a liquid, inert to the depolymerization, and raised to a temperature of from about 450° C. to 500° C., with no or very little formation of vapors from said liquid.

Another object is to provide a device, in which the heat is uniformly carried to all portions of the scrap under treatment, and more particularly in which the heat transfer medium is a molten metal in which the scraps are immersed.

Other features and advantages of the invention will appear from the following description and from the appended drawing, given as non-limitative examples; in the drawing, Fig. 1 shows an improved device according to this invention and permitting to obtain outstanding results.

The method for recovering monomeric ester from the corresponding polymer consists in immersing fragments or residues of the latter in a hot liquid bath heated to a temperature which will cause depolymerization (between about 450° C. and about 500° C.).

A very good efficiency is obtained with molten metal or molten metallic compound as immersing bath.

Practice has proved that using lead as the metal, a bath temperature comprised between 450° C. and 500° C. will produce excellent results, particularly with methyl polymethacrylate.

The molten lead bath may be replaced by a bath of other liquids heated to a temperature of from about 450° C. to about 500° C.; the boiling point of said liquids should be sufficiently high in order that, at the temperatures stated, the liquid bath will form and evolve no vapor or very little vapor, so that contamination of the monomer vapors is avoided or reduced to the minimum.

Excellent results may be obtained with metals other than lead, such as bismuth, cadmium, tin, rubidium, selenium, tellurium, thallium, zinc, the melting points of which are all lower than 450–500° C.

Eventually it would be possible to utilize a bath of molten sodium; but as stated, no or very little vapor must be evolved by the bath, to avoid to the maximum extent contamination of the monomer vapors; the bath is maintained as stated between about 450° C. and about 500° C.; and while the molten sodium boils at 877° C., it emits substantial amounts of vapors below the latter temperature.

Alloys of the bath substances above mentioned may be utilized, namely lead alloys or alloys of any of the other metals above mentioned, either with each other, or with other metals such as aluminium, antimony, magnesium.

Baths of non-metallic substances, such as silver bromide, cadmium bromide, or the fluoride or iodide of this metal could also be utilized.

In carrying this invention, the bath of liquid may be placed in a vat covered by a bell which communicates at its upper part with a vapor condensing unit; the polymethacrylate fragments or residues are placed in the bath liquid inside the vat.

Methyl methacrylate melts at 48° C. and boils at 100° C.; its polymer decomposes, and the resultant monomer vaporises, at temperatures substantially below the boiling point of the materials used in this invention as bath liquid; but the depolymerization of the polymer of methyl methacrylate is endothermic, requiring a supply of calories by heating the bath by conventional means not shown. The vapors formed in the vat from the depolymerization in the bath escape from the liquid bath, pass up into the bell, from which they travel to and into the condenser; the monomeric ester is recovered at the condenser outlet, in a pure or almost pure state.

It may be advantageous to place the fragmented substance to be depolymerized in a perforated cage 4, immersed in the liquid bath as illustrated in the drawing.

The device shown on the drawing has been improved in order to avoid calcination of the polymethacrylate. The latter is enclosed in a cage 4 constituted by a cylinder the top of which is open, and the base 4a and the lateral wall 4b of which are made of perforated sheet metal.

The base 4a of this cage extends outwardly so as to form a circular gutter 4c in which is engaged the lateral wall 13b of the bell 13.

Cage 4 and the lateral wall 13b of bell 13 are placed in open vat 11. The liquid bath 12 occupies the lower part of vat 11 and of cage 4 and bell 13, as a result of the perforations in the base 4a of the cage. The base 4a is preferably spaced away from the bottom of vat 11, thus insuring communication and circulation for the liquid bath.

The top 13a of the bell communicates with a condenser, of any conventional type, such as the tube and sphere system represented at 5, the monomer being recovered at the outlet of the latter in an almost pure state.

A pyrometer 6 and a galvanometer 7 are provided for controlling the lead-bath temperature.

The metal, lead for instance, is heated and melted in the vat up to at least 450° C., then the polymethacrylate fragments or residues are placed in said vat and immersed in said molten lead. The bell is placed on said vat, and the temperature is maintained between about 450° C. and about 500° C. The bell collects the vapors of the monomeric ester escaping through said liquid bath; said vapors are condensed in the condenser and the liquid of monomeric ester is recovered at the condenser outlet; the depolymerization and distillation are facilitated since the vapors of the depolymerized substance have the opportunity to escape through the holes provided through the lateral wall of the cage 4 into the annular channel provided between the cage 4 and the bell 13.

The lower part of bell 13 and the circular gutter 4c of cage 4 constitute with the liquid bath a hydraulic joint, while permitting the escape of the vapor out of the bell if the pressure therein increases dangerously.

Some very interesting results have been obtained by means of the process and devices object of this invention, purity of the monomer reaching up to 98%, averaging 94%.

The device can also be improved by the adjunction of uninterrupted charging means, of means for maintaining the fragments, either immersed or pressed against the bottom of the vat.

What we claim is:

1. A device for recovering monomeric methacrylate esters by depolymerization of the corresponding polymer by immersion of fragments of said polymer in a hot liquid bath of molten inorganic metals and metallic compounds inert to said depolymerization, which comprises a vat containing said liquid bath, means for heating said vat and raising said molten inorganic bath to a temperature between about 450° C. and about 500° C. with not in excess of a very small amount of volatilization, a cylindrical sheet metal cage partly immersed in said bath and adapted to receive said fragments, said cage having an open top, a perforated bottom and perforated lateral walls, a bell enclosing and capping said cylindrical cage, vapor condensing means and a vapor outlet connection between said bell and said vapor condensing means, said open top of said cage communicating freely, directly and unobstructedly over its entire cross-section with the upper portion of said bell.

2. A device as claimed in claim 1, in which the bottom wall of said cylindrical cage extends outwardly of the lateral wall of said cage and forms an external circular gutter, and in which the lateral wall of said bell is supported by said gutter.

3. A device as claimed in claim 2, in which the lateral walls of said cage and of said bell are concentric and spaced from each other, and in which an annular channel is provided between said lateral walls.

References Cited in the file of this patent

UNITED STATES PATENTS

| | | |
|---|---|---|
| 585,365 | Skiffington | June 29, 1897 |
| 606,783 | Henderson | July 5, 1898 |
| 2,030,901 | Strain | Feb. 18, 1936 |
| 2,383,921 | Soday | Aug. 28, 1945 |
| 2,470,361 | Miller et al. | May 17, 1949 |

FOREIGN PATENTS

| | | |
|---|---|---|
| 115,158 | Australia | May 28, 1942 |
| 672,739 | France | Sept. 23, 1929 |
| 460,009 | Great Britain | Jan. 19, 1937 |
| 672,739 | France | Sept. 23, 1929 |